No. 827,723. PATENTED AUG. 7, 1906.
F. HAMACHEK.
HARVESTER.
APPLICATION FILED SEPT. 22, 1904.

3 SHEETS—SHEET 1.

Witnesses,
Inventor,
Frank Hamachek
By Benedict & Morsell
Attorneys

No. 827,723. PATENTED AUG. 7, 1906.
F. HAMACHEK.
HARVESTER.
APPLICATION FILED SEPT. 22, 1904.

3 SHEETS—SHEET 2.

Witnesses.
C. H. Keeney,
R. C. Caldwell.

Inventor.
Frank Hamachek
By Benedict Morell
Attorneys.

No. 827,723. PATENTED AUG. 7, 1906.
F. HAMACHEK.
HARVESTER.
APPLICATION FILED SEPT. 22, 1904.

3 SHEETS—SHEET 3.

Witnesses:
C. H. Keney,
R. S. Caldwell.

Inventor.
Frank Hamachek
By Benedict & Morsell
Attorneys.

UNITED STATES PATENT OFFICE.

FRANK HAMACHEK, OF KEWAUNEE, WISCONSIN.

HARVESTER.

No. 827,723.  Specification of Letters Patent.  Patented Aug. 7, 1906.

Application filed September 22, 1904. Serial No. 225,409.

*To all whom it may concern:*

Be it known that I, FRANK HAMACHEK, residing in Kewaunee, in the county of Kewaunee and State of Wisconsin, have invented new and useful Improvements in Harvesters, of which the following is a description, reference being had to the accompanying drawings, which are a part of this specification.

This invention relates to harvesters, and has for its object to provide certain new improvements in the construction thereof, either in the machines themselves or by attachments thereto, whereby they may be made more efficient for harvesting lodged grain or vine crops.

A further object of this invention is to provide for operating suitable conveyer-fingers in such a machine, together with clearing-wheels for relieving the conveyer guard-fingers of the cut material and without interfering with the tilting or raising of the cutter-bar in the usual manner.

Another object of the invention is to provide means for delivering the cut material to the side of the machine either in a continuous windrow or in compact piles.

A further object of this invention is to provide means for lifting such delivering means out of its operative position to permit of turning the machine and for other purposes.

With the above objects in view the invention consists in the harvester or attachments, the parts thereof, and the combinations of parts and their equivalents, as hereinafter set forth.

Figure 1:
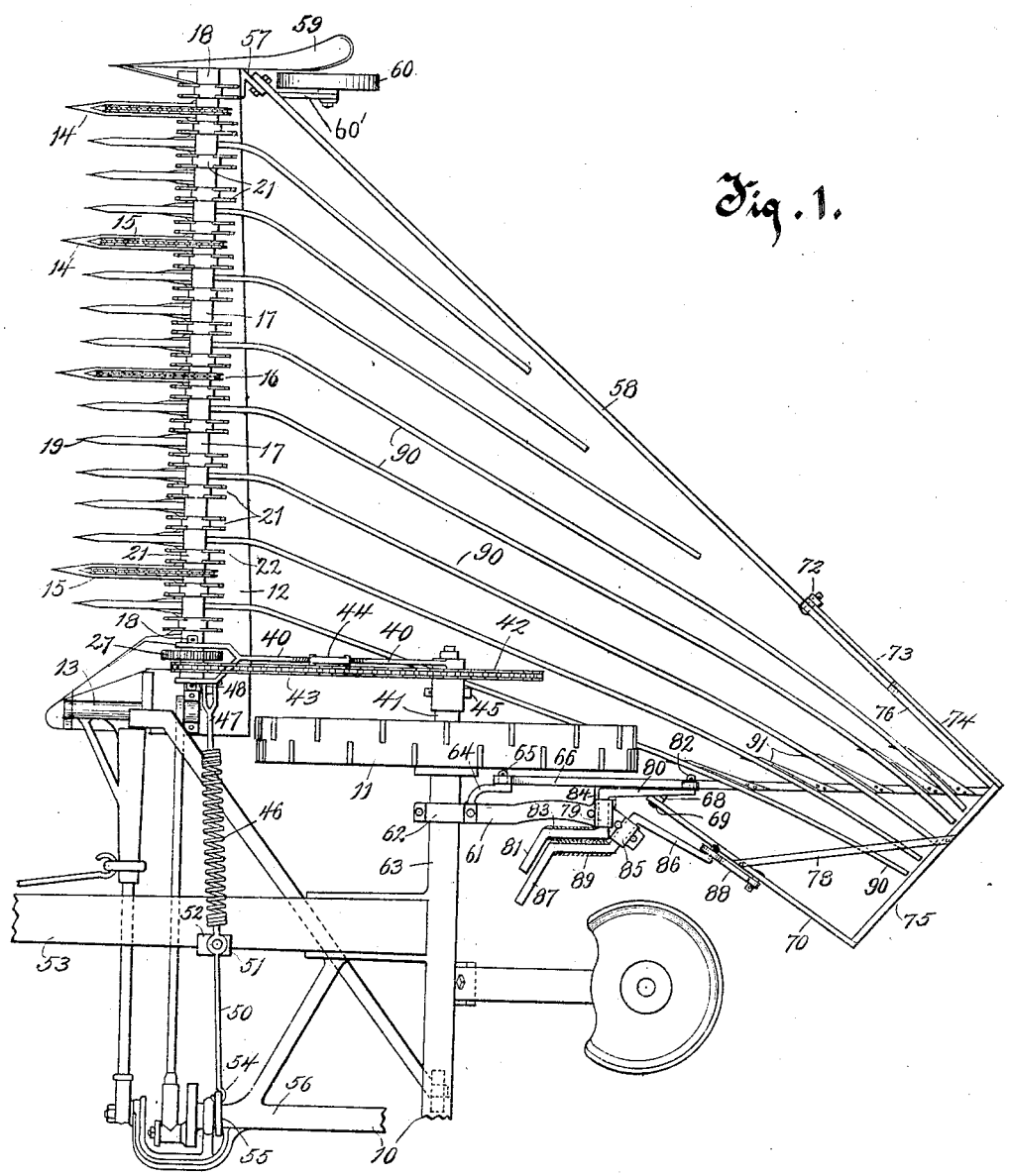
Figure 2:
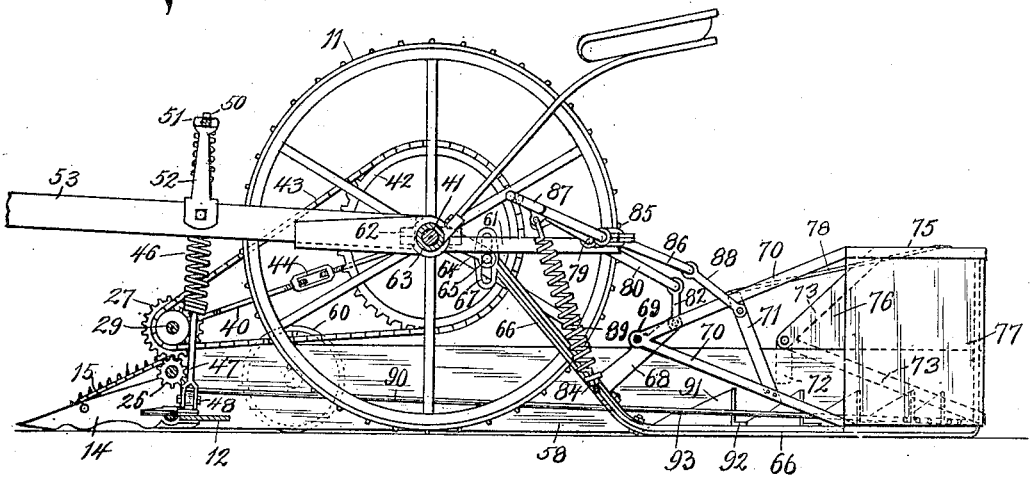
Figure 3:
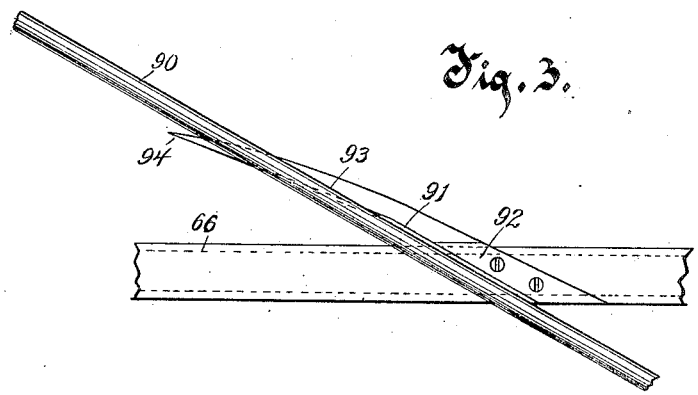
Figure 4:
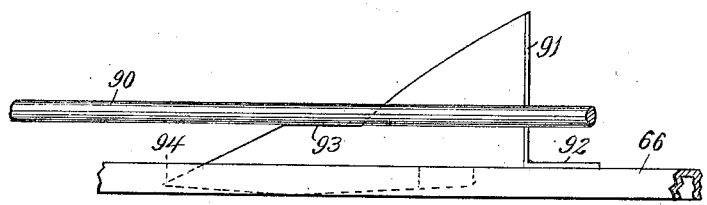
Figure 5:
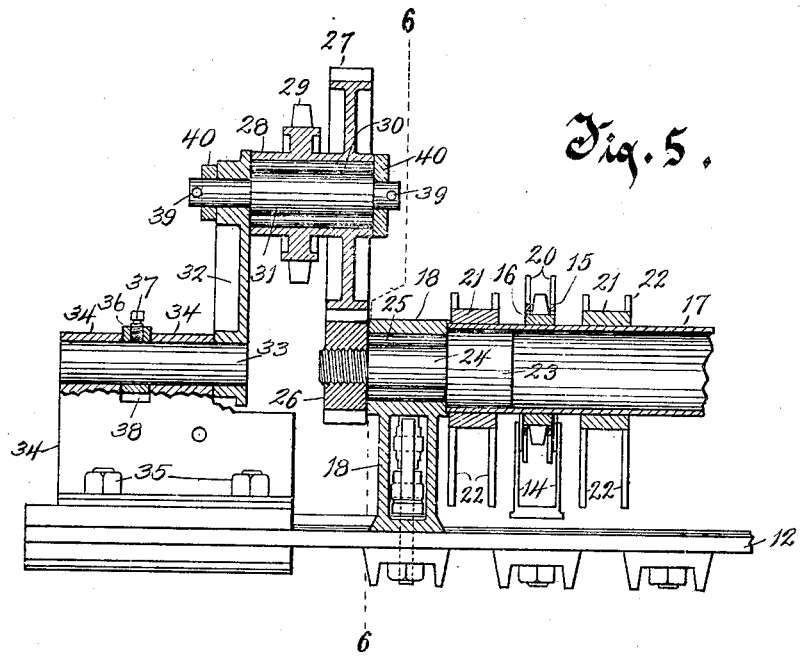
Figure 6:
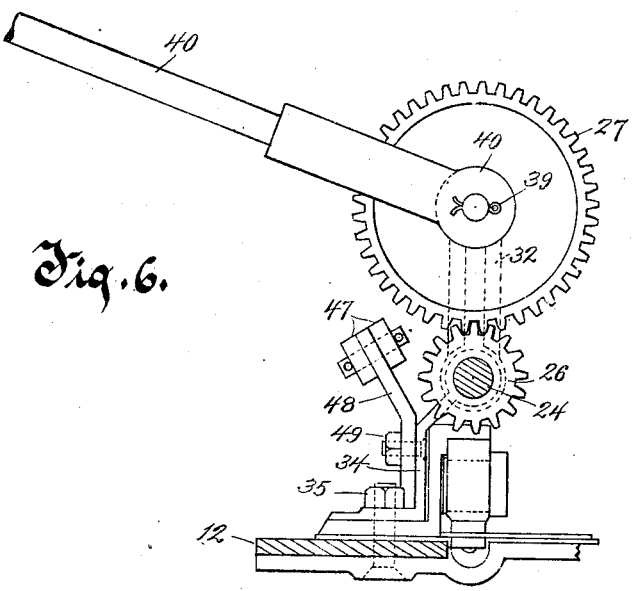

Referring to the accompanying drawings, in which like characters of reference indicate the same parts in the several views, Figure 1 is a plan view of a portion of a harvester provided with attachments embodying the present invention. Fig. 2 is a side elevation thereof, parts being sectioned to better illustrate the construction. Fig. 3 is a plan view of a portion of a clearing-rod and its rear support. Fig. 4 is a side elevation thereof. Fig. 5 is a sectional elevation of the cutter-bar shaft and its operating means, and Fig. 6 is an end elevation of such operating means with parts sectioned on the line 6 6 of Fig. 5.

In the drawings, 10 represents the framework of an ordinary mowing-machine, 11 being one of the traction-wheels thereof, and 12 being the finger-bar of the cutting mechanism, pivotally mounted on the framework 10 at 13 in the ordinary manner. The finger-bar 12 is provided with the usual means for causing it to tilt or swing upwardly slightly on the pivot 13 in order to raise the cutting mechanism from the ground and permit the machine to turn and to be carried over fields where it is not desired to produce the cutting operation; but this mechanism is not shown in the drawings, as it is of ordinary construction and does not constitute a part of the present invention, and its presence would only serve to obscure the new features of this invention.

Mounted upon the finger-bar 12 of the cutting mechanism at desired distances apart are a series of conveyer-fingers 14, and each comprises a body portion in the form of a guard-finger with means for mounting an endless conveyer-chain 15, so as to travel in an incline from the front end of the body portion to one of a number of sprocket-wheels 16 on a conveyer-shaft 17, which is journaled lengthwise of the finger-bar 12 in suitable bearings 18. Between the conveyer guard-fingers 14 are also secured to the finger-bar 12 a number of regularly-spaced guard-fingers 19 of any approved type.

The conveyer-chains 15 are provided with outwardly-extending engaging spurs 20, which serve to catch into the grain or vines which have been raised by the inclined surface of the front end of the body portion 14 and forcibly lift and carry them to the rear, where they are removed from the chain conveyers by clearing-wheels 21, which are also mounted on the shaft 17 and are provided with pairs of radially-extending fingers 22 to lift the material from the chains and discharge it in the rear of the cutting mechanism. The clearing-wheels 22 are arranged between each pair of the guard-fingers, so as to clear the grain and vines from the intermediate guard-fingers 19, as well as from the conveyer guard-fingers 14.

The shaft 17 is preferably tubular in order to be as light as possible and is journaled at its two ends by means of solid plugs or bosses 23, tightly fitting therein and which have reduced shank portions 24, which pass through larger-sized openings through the bearing-posts 18 and receive free bearing therein by means of antifriction-rollers 25, surrounding them. A pinion 26 is threaded upon the projecting end of shank 24 and meshes with a gear-wheel 27, formed integral on a hub 28 with a sprocket-wheel 29. The hub 28 is journaled, with interposed antifricion-rollers 30, upon a crank-pin 31, carried by a crank 32, which is mounted on a rock-shaft 33, said rock-shaft being journaled in axial alinement with the shaft 17 in a suitable bracket-bearing 34, which is rigidly secured to the finger-bar 12 by means of bolts 35. The rock-shaft 33 is prevented from longitudinal movements in the bearing 34 by means of a collar 36, fixed thereon by a set-screw 37 and confined within a slot 38 of the bearing 34.

The crank-pin 31 is secured to the crank-arm 32 by having a reduced end passed through an opening in the upper end of the crank-arm 32 and held there by means of a cotter-pin 39, one member of the forked end of a lever 40 being held upon the reduced end of the crank-pin 31 between the crank-arm 32 and the cotter-pin 39. The other end of the crank-pin 31 is also reduced and similarly receives the other member of the forked end of lever 40, holding it by another cotter-pin 39, passed through the reduced end of the crank-pin. The lever 40 at its other end is pivotally mounted upon the drive-shaft 41 of the mowing-machine, which receives its motion from the traction-wheel 11, and a large sprocket-wheel 42, carried by said shaft, drives the sprocket-wheel 29 by means of a chain 43, traveling around them both.

The lever 40 is provided at its middle portion with a turnbuckle 44, by which the chain 43 may be tightened, the lengthening of the lever 40, produced by turning the turnbuckle, causing the crank-arm 32 to move the sprocket-wheel 29 farther away from the drive-shaft 41 by turning the rock-shaft 33 in its bearing 34. A further object of the lever 40 is to permit of the gearing of the conveyer-shaft 17 with the drive-shaft and still permit of the tilting or raising of the cutter-bar.

By removing the cotter-pin 45, which couples the sprocket-wheel 42 to the drive-shaft 41, the sprocket-wheel 42 may be uncoupled from the drive-shaft 41, so as to permit the shaft to turn freely therein without driving the conveyer-shaft 17.

In order to partially counterbalance the weight of the cutting mechanism, a heavy coil-spring 46 has one end pivotally connected, by means of a yoke 47, with an arm 48, which is secured by a bolt 49 to the bracket 34, carried by the cutter-bar, and its other end is carried upwardly and is connected by a rod 50, having an eye 51 to engage a standard 52, mounted on the draft-bar 53 of the mower-frame. The eye of rod 50 is fitted upon a boss on the top of the standard 52 and bears on a shoulder therebeneath, while the longer portion of the rod 50 continues beyond the standard 51 to connect, by means of its hooked end 54, with a ring 55, surrounding the tube 56 of the mower-frame which carries crank disk-shaft.

The spring 46 being a contractible spring under a considerable tension has the tendency to lift the finger-bar 12 upon its pivotal connection 13, and thus render the tilting operation of the cutting mechanism much easier than if the entire weight of the cutting mechanism were required to be raised by the operator. The connection of the spring 46 to the standard 52 without the support it receives by the connection of the rod 50 with the spring 55 would exert a twisting tendency upon the draw-bar 53 and the standard 52 liable to loosen them in time; but this is obviated by the said connection of the rod 50 with the ring 55 on the opposite side of the standard 52 from the spring 46.

At the extreme outer end of the finger-bar 12 is an angular bracket 57, to which is pivoted a horizontally-arranged guide-board 58, standing vertically on its edge and extending at an angle to the direction of travel of the machine. Secured to the guide-board 58 just inside of the usual divider 59, carried by the cutter-bar, is a trundle-wheel 60, bearing on the ground and supporting the end of the cutter-bar at the proper distance from the ground. The trundle wheel or roller 60 is carried on a suitable bracket 60' on the guide-board and is held in such a position that it constitutes a pivotal support for the cutting and delivery mechanism, approximately counterbalancing them when the leading-rods are supporting cut material.

A rearwardly-extending bracket 61 is secured by a clamp 62 to the tubular drive-shaft casing 63 of the mower-framework, and from said bracket 61 extends an angular arm 64, having a pivotal boss 65, upon which is slidingly and pivotally mounted the upper end of an inclined trailing or drag bar 66, which is provided with a vertical elongated slot 67 in its upper end to receive the pivotal boss 65 and permit of the vertical sliding connection, as well as the pivotal connection, for the drag-bar 66. The rear end of the drag-bar 66 is bent to a horizontal position and is adapted to bear upon the ground in the rear of the mower-frame, and at its back end it is secured to the rear end of the guide-board 58 to support said guide-board in its angular position to the direction of draft. The connection of the drag-bar 66 with the mower-frame being such as to permit of a vertical play between them enables the drag-bar 66 to always rest upon the ground notwithstanding irregularities in the surface thereof.

The drag-bar 66 at its inclined portion is provided with a bracket 68, to which is pivoted at 69 a V-shaped side frame 70, preferably formed of strap metal, with a brace 71 connecting the two members thereof, while to the guide-board 58, in alinement with the axis of the pivot 69, is secured a bracket 72, to which is pivoted a somewhat similar side frame 73; but the upper member thereof is at a greater incline than the upper member of the side frame 70 and continues in a horizontal portion 74, which is connected by a rod 75 with the upper member of the side frame 70.

The side frame 73 carries an extension-board 76 to rest upon the upper edge of the rear end of the guide-board 58, when the side frame 73 is in its lower position, and between the two side frames 70 and 73 and secured to the rod 75 is the sheet-metal end plate 77, extending down to the level of the upper surface of the drag-bar 66 and forming, with the extension-board 76 and the two pivoted side frames, a swinging gate open on one side, but closed on the other side and in the rear. A brace 78 connects the upper member of the side frame 70 with the rod 75 to make the gate more rigid and preserve its proper shape.

Near the rear end of the bracket 61 is a bearing 79, in which is journaled a crank-lever 80, bent to form a foothold 81 on the forward end and connected, by means of a link 82, at the rear end to the upper end of bracket 68 on the drag-bar 66, so that when the said crank-lever is depressed by the foot of the operator the deflector-frame, formed by the drag-bar 66 and the guide-board 58, is raised upon its two pivotal connections with the bracket 57 and with the arm 64. These pivotal connections are not in axial alinement; but the play of the slot 67 of the drag-bar 66 on the pivotal boss 65 will allow for such irregularity and permit the deflector-frame to be raised slightly, sufficient to remove its parts from the ground and allow of turning the machine. To assist in this lifting operation, the crank-lever 80 is connected near its front end with one end of a coil-spring 83, the other end of which is connected to a laterally-extending lug 84 on the drag-bar 66, and this spring serves the double purpose of assisting the crank-lever 80 to be depressed and the drag-bar 66 to rise.

On the extreme rear end of the bracket 61 is another bearing 85, in which is also journaled a crank-lever 86, whose front end is bent to form a foothold 87, extending close to and parallel with the foothold 81 of the crank-lever 80 for raising the deflector-frame; but the foothold 87 is somewhat longer than the foothold 81 and is therefore adapted to be operated singly, while the foothold 81 is best adapted to be operated in conjunction with the foothold 87. The rear end of the crank-lever 86 is connected by a link 88 to the brace 71 of the side frame 70, and by this means when the crank-lever 86 is operated the end-gate is swung upon the pivotal connections of its side frames and raised out of its normal position for a purpose to be later described. To assist in this operation, a coil-spring 89, parallel to the coil-spring 83, connects the foothold 87 to the lug 84 on the drag-bar 66, and thus partially counterbalances the weight of the end-gate.

It will be noted that the initial direction of pull exerted by the crank-levers 80 and 86 upon the deflector-frame and the end-gate, respectively, by means of their links 82 and 88 is nearer tangential to the arc of swing of these parts than the direction of pull at the completion of such movements, and consequently the leverage of the crank-levers 80 and 86 is greater at the beginning. This is a desirable feature, because the greatest resistance met with in producing such movements is at the beginning, when the inertia of the parts has to be overcome.

Secured to the finger-bar in any desirable manner, and preferably protected by the guard-fingers thereof, are regularly-spaced metal clearing-rods 90, which are bent to extend at an angle to the cutter-bar in the direction of the machine-frame and converge to the end-gate above described. The clearing-rods nearest the outer end of the cutting mechanism terminate before reaching the drag-bar 66, but being formed of spring metal maintain their proper positions without further support.

The longer clearing-rods 90, which extend to the end-gate, are supported from the drag-bar 66 by means of a series of supporting-blades 91. These are angular in cross-section to provide base-flanges 92, by which they may be bolted or otherwise secured to the top of the drag-bars 66, from which they extend at an angle corresponding to the angle of the clearing-rods which they support.

The supporting-blades 91 have their upper portions bearing against the rear of the clearing-rods 90, and extending thereabove with inclined front edges and at intermediate portions thereof they have straight horizontal portions 93, which pass obliquely beneath the clearing-rods 90 and upon which the clearing-rods rest. From this bearing portion 93 they continue in front of the clearing-rods 90 with inclined edges leading to sharpened points 94, their lower edges being slightly rounded to bear upon the ground at a short distance to the rear of their front points 94.

From the foregoing it will be understood that in operation the drive-shaft 41, being turned by the traction-wheel 11 during the forward motion of the machine, imparts its rotation to the sprocket-wheel 42, which in turn, by means of the chain 43, drives the sprocket-wheel 29 and the gear-wheel 27, which is rigid therewith. The gear-wheel 27, meshing with the pinion 26, drives the shaft 17 to rotate the clearing-wheels 21 and operate the chain conveyers 15. The speed at which the chain conveyers 15 move is greater than the speed of travel of the machine, so that the spurs 20 of the conveyer-chains will engage the lodged grain or vines and quickly draw them to the rear and upwardly with force to lift the ends of the grain or vines, carrying the heads or pods above the cutter mechanism, so that only their root ends will be cut and none will be passed over uncut. The clearing-fingers 22 lift the cut material from the chain conveyers and the ordinary guard-fingers 19 and discharge it in the rear of the cutting mechanism and upon the leading-rods 90. The forward motion of the machine causes the stubble from which the grain or vines have just been cut to engage with the grain or vines held by the leading-rods 90 and hanging down therebetween and attempt to hold this material stationary while the machine travels forward; but the angular position of the leading-rods 90 serves, in conjunction with the said tendency of the stubble to hold the material still, to deflect the material or cause it to move in a side direction until it is discharged at the rear end of the deflecting-frame by passing off from the ends of the leading-rods, the end-gate being presumed to be in its open position for the present. Any cut material which escapes the leading-rods 90 will be guided in the proper direction by means of the guide-board 58, and the result will be that the path over which the cutter-bar has just passed will be left free of cut material, and such material will be lined up in a windrow in the path which the draft-horses have just taken, and thereby leave a clear path for the horses for the next cut. In order to give support to the leading-rods 90 without forming a means for gathering cut material, and thereby form an obstruction to the free passage of the following material, the supporting-plates 91 are employed, and by their means the leading-rods 90 are given rear support from the drag-bar 66, traveling on the ground. In event of material being caught between the leading-rods 90 and these supporting-plates 91 the nature of their relation is such that such material will be wedged under the leading-rods 90, lifting them slightly at their free ends until the material has passed between the leading-rods and the supporting-plates, when said leading-rods will again resume their normal positions upon the horizontal surface of the supporting-plates. As seen in Fig. 2 of the drawings, the leading-rods are slightly lower at their rear free ends than they are at their front ends. When it is desired to leave the cut material in compact piles instead of in a continuous windrow, the end-gate is left closed, so as to accumulate the cut material in the V-shaped pocket from by the rear end of the guide-board 58 with its extension, board 76 thereabove and the end plate 77, and when sufficient material has been thus gathered the operator depresses the crank-lever 86 by pressing with his foot upon the foothold 87 to raise the end-gate and permit the pile of cut material to pass from the leading-rods. As soon as this is done the operator's foot is removed from the crank-lever and the gate permitted to close to accumulate another pile of cut material, when the operation is repeated. In turning corners it is necessary that the cutting mechanism and the deflecting-frame, together with the leading-rods therein, should be raised from the ground, and this I accomplish, notwithstanding the gearing connection between the drive-shaft and the shaft 17, by simultaneously raising the cutter-bar upon the pivotal connection 13 in the usual manner and lifting the deflecting-frame by the operator placing his weight upon the footholds of the two crank-levers 80 and 86, so that the drag-bar 66 will be raised from the ground and lift with it the rear ends of the leading-rods and the rear end of the guide-board 58, the front end of said guide-board being raised with the cutter-bar. The drag-bar 66 is more easily raised by means of the two crank-levers 80 and 86, operated in conjunction, than would be the case if the crank-lever 80 alone were relied upon, for the crank-lever 86 helps by raising the end-gate. In the raising of the cutter-bar the gearing connection between the shaft 17 thereon and the drive-shaft does not interfere, for as the shaft 17 is raised nearer to the plane of the drive-shaft 41 the distance between the crank-pin 31 and the drive-shaft 41 is not diminished, but is kept constant by the rod 40, and the crank-lever 32 is required to swing forward by turning its rock-shaft 33, the gear-wheel 27 remaining in mesh with the pinion 26 as the rock-shaft 33 is in axial alinement with the shaft 17. The lowering of the cutter-bar of course requires the crank-arm 32 to swing back to its original position, so that the gear-wheel 27 is directly over the pinion 26, as shown in Fig. 2. During the tilting operation of the cutter-bar the yoke end of rod 40 is caused to twist with relation to the other end thereof, and this is permitted by means of the turnbuckle 44.

What I claim as my invention is—

1. In a harvester, a cutter-bar, a series of leading-rods having connection with the cutter-bar and extending rearward and laterally at an angle thereto, a guide-board connected to the cutter-bar and also extending rearward and laterally at an angle thereto, and means connected with the guide-board and supporting the rear ends of the leading-rods.

2. In a harvester, a cutter-bar, a series of leading-rods having connection therewith and extending rearward and laterally at an angle thereto, a guide-board connected to the cutter-bar and also extending rearward and laterally at an angle thereto, a means connecting the guide-board to the frame of the machine and serving to support the rear ends of the leading-rods.

3. In a harvester, a cutter-bar, leading-rods having connection therewith and extending rearward and laterally at an angle thereto, a guide-board connected with the cutter-bar and also extending rearward and laterally at an angle thereto, a bar having connection with the frame of the machine and to the guide-board, and supporting-plates carried by the bar adapted to support the rear ends of the leading-rods.

4. In a harvester, a cutter-bar, leading-rods having connection therewith and extending rearward and laterally at an angle thereto, a guide-board connected to the cutter-bar and also extending rearward and laterally at an angle thereto, a bar connecting the guide-board with the frame of the machine, and supporting-plates mounted on the bar comprising upwardly-extending blades having an inclined front edge with a horizontal surface therein on which the leading-rods are adapted to rest, said blades passing beneath the leading-rods and bracing them against lateral movement by the rear portions thereof bearing against the sides of the leading-rods.

5. In a harvester, a cutter-bar, leading-rods having connection therewith and extending rearward and laterally at an angle thereto, a guide-board connected to the cutter-bar and also extending rearward and laterally at an angle thereto, a bar connecting the guide-board to the framework of the machine, and supporting-blades on the bar adapted to support the rear ends of the leading-rods, said supporting-blades each comprising a plate angular in cross-section and provided with an inclined upper surface with a horizontal portion therein upon which the leading-rod rests, said horizontal portion extending obliquely beneath the leading-rod and the rear portion of the plate preventing lateral movement of the leading-rod by bearing thereagainst while permitting of a vertical movement of the leading-rod.

6. In a harvester, a cutter-bar, leading-rods having connection therewith and extending rearward and laterally at an angle thereto, a guide-board connected to the cutter-bar and also extending rearward and laterally at an angle thereto, a bar connecting the guide-board to the framework of the machine, and a movable gate at the rear ends of the leading-rods adapted in its closed position to accumulate cut material deflected by the leading-rods and the guide-board toward one side of the machine and when opened to discharge said material in a pile.

7. In a harvester, a cutter-bar, leading-rods having connection therewith and extending rearward and laterally at an angle thereto, a guide-board connected to the cutter-bar and also extending rearward and laterally at an angle thereto, a bar connecting the guide-board to the framework of the machine, and a gate pivotally mounted to the guide-board and the bar adapted to accumulate cut material deflected thereto by the leading-rods and the guide-board and to discharge same in a pile when opened.

8. In a harvester, a cutter-bar, leading-rods having connection therewith and extending rearward and laterally at an angle thereto, a guide-board connected to the cutter-bar and also extending rearward and laterally at an angle thereto, a bar connecting the guide-board to the framework of the machine, a gate pivoted to the guide-board and to the bar, and means mounted on the framework of the machine for opening the gate.

9. In a harvester, a cutter-bar, leading-rods having connection therewith and extending rearward and laterally at an angle thereto, a guide-board connected to the cutter-bar and also extending rearward and laterally at an angle thereto, a bar connecting the guide-board to the framework of the machine, a bracket on the bar, a gate pivotally mounted on the guide-board and the bracket, a bracket mounted on the framework of the machine, a crank journaled therein, and a link connecting the crank with the gate.

10. In a harvester, a cutter-bar, leading-rods having connection therewith and extending rearward and laterally at an angle thereto, a guide-board pivotally connected to the cutter-bar and also extending rearward and laterally at an angle thereto, a bracket secured to the framework of the machine, a drag-bar pivotally connected thereto and having connection with the guide-board, a crank journaled in the bracket, and a link connecting the crank with the drag-bar, whereby the rear end of the deflector-frame formed by the guide-board and the drag-bar may be raised.

11. In a harvester, a cutter-bar, leading-rods having connection therewith and extending rearward and laterally at an angle thereto, a guide-board pivotally connected to the cutter-bar and also extending rearward and laterally at an angle thereto, a bracket secured to the framework of the machine, a drag-bar having a slotted pivotal connection therewith and connected to the guide-board, a crank journaled on the bracket, a link connecting the crank to the drag-bar whereby when the crank is operated the deflector-frame formed by the guide-board and the drag-bar will be swung upon the pivotal connections of these parts, a swinging gate pivoted to the guide-board and to the drag-bar, a second crank journaled in the bracket, and a link connecting it to the swinging gate whereby when the second crank is operated the gate will be swung on its pivotal connections.

12. In a harvester, a cutter-bar, leading-rods connected therewith and extending rearward and laterally at an angle thereto, a guide-board pivotally connected to the cutter-bar, a bracket secured to the framework of the machine, a drag-bar having a slotted pivotal connection therewith and connected to the guide-board, a crank journaled on the bracket, a bracket on the drag-bar, a link connecting the crank with the bracket on the drag-bar, a coil-spring connecting the crank with the drag-bar, a gate pivoted to the guide-board and to the bracket on the drag-bar and having an end plate and a side board forming an upward extension of the guide-board, a second crank pivoted to the bracket, a link connecting it to the gate, and a spring connecting the second crank with the drag-bar.

13. In a harvester, a cutter-bar, leading-rods having connection therewith and extending rearward and laterally at an angle thereto, a guide-board having pivotal connection with the cutter-bar, a bracket secured to the framework of the machine, a drag-bar having a slotted pivotal connection with the bracket whereby it may remain in contact with the ground during the operation of the machine, said drag-bar being connected to the rear end of the guide-board, a bracket on the drag-bar, a gate comprising V-shaped side frames pivoted to the guide-board and to the bracket of the drag-bar and an end plate and a side board forming an extension of the guide-board, a brace connecting the members of the side frame pivoted to the bracket on the drag-bar, a crank journaled in the bracket secured to the framework of the machine, a link connecting said crank with the bracket on the drag-bar, a second crank journaled in the bracket secured to the framework of the machine, a link connecting said second crank to the brace, and coil-springs connecting the two cranks with the drag-bar, the link connections between the cranks and the gate and drag-bar respectively being so arranged that the leverage of these cranks is greater at the start of their operation than at the finish, and said cranks having their ends forming footholds extending parallel and in close relation to each other and the foothold of the gate-opening crank extending beyond the foothold of the other crank, whereby both may be operated simultaneously or the gate-opening crank may be operated singly.

14. In a harvester, a cutter-bar having pivotal connection with the framework of the machine, a shaft journaled thereon, a grain-engaging means driven by the shaft, a pinion having connection with the shaft, a crank having its shaft in axial alinement with the pinion, a gear-wheel mounted on the crank and meshing with the pinion, a sprocket-wheel in connection with the gear-wheel, a sprocket-wheel driven from the drive-shaft of the machine, a rod having pivotal connection concentric with the sprocket-wheel driven by the drive-shaft of the machine and having a yoked connection with the crank, said rod having a turnbuckle between its ends whereby one end thereof may be turned irrespective of the other end, the crank being caused to swing by means of the rod without effecting the driving connections for the shaft when the cutter-bar is swung on its pivotal connection, leading-rods having connection with the cutter-bar and extending rearward and laterally at an angle thereto, a guide-board having pivotal connection with the outer end of the cutter-bar, a bracket secured to the framework of the machine, a drag-bar having a slotted pivotal connection to the bracket and connected to the rear end of the guide-board, a crank journaled in the bracket, and a link connecting the crank to the drag-bar, whereby when the crank is operated the deflector-frame formed by the drag-bar and the guide-board are swung upon the pivotal connections of these parts to raise the rear ends of the leading-rods from the ground, while the front ends of said leading-rods are being raised from the ground by the swinging of the cutter-bar on its pivotal connection.

In testimony whereof I affix my signature in presence of two witnesses.

FRANK HAMACHEK.

Witnesses:
R. S. C. CALDWELL,
ANNA F. SCHMIDTBAUER.